Patented Dec. 17, 1935

2,024,683

UNITED STATES PATENT OFFICE 2,024,683

GELATIN PRODUCT AND METHOD OF MAKING SAME

Chester H. Epstein, Highland Park, and Nathan R. Gotthoffer, Grayslake, Ill., assignors to Grayslake Gelatin Co., Grayslake, Ill., a corporation No Drawing. Application May 5, 1932, Serial No. 609,491

16 Claims. (Cl. 99—11)

This invention relates to a gelatin product and the process of manufacturing the same. It has for its object the production of a very high quality gelatin possessing the desirable characteristics of exceptional purity and freedom from odor, high gelatinizing value and high viscosity. As a further object it effects the formation of an edible gelatin product by a process employing only edible materials.

It may be well first to consider the characteristics of a gelatin product which determines its quality. In the first place purity of the product is essential, and this is determined in large measure by the appearance and odor of the product in solution and also by its ash content. A good gelatin product should be sparkling clear in solution, should have a pale amber color, should be free from all objectionable odor and its ash content should be at a minimum value.

Another qualitative feature of gelatin is its gelatinizing value or gel strength. This is determined by various mechanisms practically all of which operate on the same principle. Samples of the gelatin to be tested are dissolved under standard conditions and at a definite concentration after which they are kept at 50° F. for a period of sixteen hours. A plunger is then adjusted to the surface of the jelly and the weight required to depress this plunger a given distance through the jelly is determined and recorded as the jelly strength of the gelatin. Gelatins having higher gelatinizing values will form stiffer jellies and thus offer greater resistance to the plunger so that more weight will be required to depress the plunger the fixed distance and higher values accordingly obtained.

This factor of gelatinizing value is of the utmost importance in practically all the applications of gelatin and is a direct measure of the value of the gelatin to the consumer. Thus in a gelatin dessert product, for example, a gelatin of high gelatinizing value will replace a correspondingly greater quantity of a lower test gelatin so that a lesser amount of the higher test product can be employed.

In like manner a high viscosity is a desirable feature in a gelatin product because a gelatin of high viscosity will set to a jelly faster than a product of like strength but lower viscosity, when the two products are prepared in identical manner. A higher viscosity will also impart more body to a gelatin solution which is desirable in many of the applications to which gelatin is put. The viscosity is measured in any of the standard type viscosimeters or may be determined simply by timing the flow of a gelatin solution through a tube containing a small orifice, the gelatin solution being kept at a definite concentration and temperature. The particular tube employed is first calibrated so that the seconds of flow can readily be converted to the standard millipoise units.

Other characteristics of a good quality gelatin product are as follows: It should dissolve readily in hot water and when immersed in cold water should soak up very rapidly and also should absorb a large quantity of the cold water. This "water absorption power" may be readily measured by simply adding a weighed quantity of gelatin to a definite volume of water at a constant temperature and noting the amount of water soaked up after an established time of contact between the water and the gelatin.

Still another feature of a good quality gelatin product is its ability to whip up or beat up rapidly and yield a stable foam, that is, one which will not break down quickly. Finally a good quality gelatin should have excellent emulsifying qualities as determined by practical tests.

The invention of the digestor by Papin in 1682 marked the beginning of the preparation of gelatin on a commercial scale. Papin's digestor consisted simply of a contrivance for cooking bones with steam. The next step in the evolution of gelatin production was the discovery made in the early eighteenth century that if the bones were treated with inorganic acid prior to cooking with the steam the gelatin could be much more readily extracted from them and, indeed, the product obtained would be of a higher quality than resulted when this inorganic acid treatment was not employed. For this purpose, hydrochloric acid was commonly used.

All of these early processes employed bones as the raw material source for the gelatin. Today practically all of the gelatin commercially produced is prepared from three classes of raw materials, namely: bones, calf-skins and pig-skins. While there is a great diversification of processes for treating these materials, the essential differences between them lie chiefly in details of operation and in methods of handling. Practically all of the processes call for acidulation of the raw material at some point during the manufacture and prior to the extraction of the gelatin. The conditioned raw material is then treated with hot water or steam to extract the gelatin and the gelatin solution thus obtained is clarified and dried by various methods.

Bones are generally degreased with organic solvents and the mineral matter is then removed by treatment with acid, yielding a product called ossein, which is employed to a great extent for the manufacture of gelatin. This material is treated with a lime solution over an extended period to soften the material and dissolve out the mucins and foreign proteins after which it is washed free of lime, acid being employed in the later stages of the deliming process.

Calfskins, as commonly used by the gelatin manufacturer, are the trimmings from tanner's stocks and are first limed for a period of from six to twelve weeks. After the skins have been thoroughly limed they are washed free of the lime and in this step inorganic acid is employed, hydrochloric and phosphoric acids being usually used for gelatin manufacture and sulphurous acid where glue is the desired end product.

It is with the third class of raw materials, namely pigskins, that this invention more particularly, but by no means exclusively, deals. The pigskins employed by the edible gelatin manufacturer reach the plant in a fresh frozen state, are an edible product, and bear the stamp of the U. S. Department of Agriculture—Bureau of Animal Industry. The method of procedure with these skins is somewhat different from the processes described above, which are employed with bones and calfskins. The frozen pigskins are washed with cold water in large vats to remove any surface dirt and to thaw out the solidly frozen bundles. During the later stages of the washing period a dilute inorganic acid solution may be employed which is absorbed by the skins and which can be controlled to any desired endpoint. The acid serves to facilitate the subsequent extraction of the gelatin from the skins, on treatment with hot water, and plays a very important part in the quality and quantity of the gelatin obtained.

Gelatin, as such, does not exist in the animal skin but is obtained by hydrolysis of the protein collagen. This hydrolysis, which is accomplished in practice by cooking the washed skins with hot water, is by no means a simple process but is accompanied by complex reactions involving a secondary hydrolysis of the gelatin obtained to various peptones and amino acids which have no gelatinizing value and are therefore worthless in connection with the various uses to which gelatin is put. The extent of this secondary conversion can, of course, be gauged by the quality of the resulting product as determined by the various tests for gelatinizing value, viscosity, water absorption power, emulsifying action, beating or whipping qualities, etc., as described above. It has been found that by careful control of the amount of acid absorbed by the skins one can reach a point where the hydrolysis of collagen to gelatin takes place very rapidly while at the same time the secondary, undesirable hydrolysis of gelatin to peptones is kept at or near a minimum, thus yielding a gelatin product of very high quality.

It is to this very important step of acidulation that our invention directly relates. We have found that not only is the amount of acid employed of vast importance but also that the character or nature of the acid used exerts a very important influence in determining the quality of the resultant gelatin product. In place of the acids commonly employed for acidulation, such as sulphuric, phosphoric and hydrochloric acids, we resort to an entirely different class of compounds for accomplishing the desired acidulation, namely to the class of compounds comprising the organic acids, and in one particular embodiment of this invention, to the edible organic acids, such as, for example, tartaric acid or citric acid.

We have found that when tartaric acid, for example, is used as the sole acidulating agent in the treatment of pigskins, the final gelatin extracted is of a very high quality, possessing, among other advantages, a high gelatinizing value and superior viscosity. We have also observed that the products obtained by this new method have a distinct advantage over the older products in that they are comparatively free from odor. Another particular consideration in connection with the production of gelatin from pigskins acidulated by tartaric acid is that such a process comprises the manufacture of an edible gelatin product by a method employing only edible materials.

A possible explanation for the benefits derived from the employment of these organic acids may be found in the fact that they are very poorly ionized in comparison with the inorganic acids commonly employed. When, for example, sulphuric acid is used as the acidulating agent the pH value of the dilute acid solution employed for the purpose may reach a value in the neighborhood of 1.0. On the other hand, when tartaric acid is utilized in the requisite amounts the pH value of the solution is considerably higher, being in the neighborhood of 2.4. There is no doubt but that the exposure of the skins to the lower pH value obtained with the inorganic acids commonly employed, even though only for a short time, does effect some damage to these skins and consequently to the quality of the gelatin product ultimately obtained therefrom. When the poorly ionized organic acids, such as tartaric acid, are employed with their resulting higher pH value in solution, this deleterious effect is minimized and consequently a higher grade gelatin product results.

It will be apparent that many possible variations of this process can be employed, all of which, however, come within the scope of our invention, in manufacturing a gelatin product by a process in which one or more organic acids are employed as acidulating agents. Thus, partial benefits can be derived from the use of one or more organic acids in combination with one or more inorganic acids, and we consider such a combination as coming within the scope of our invention. In another variation, one or more inorganic acids may be employed in combination with one or more salts of organic acids, thus serving to form the organic acids in effect. It is also possible to use organic acids and organic salts in combination, the salts acting as buffer salts, and serving further to depress the ionization of the organic acid or acids employed. However, this particular procedure cannot be carried too far, as we have found that when the pH value of the acidulating solution becomes too high, the raw material will not take up the acid readily so that some of the benefits of the process are sacrificed. All of these variations, and in fact any other combinations involving organic acids or a mixture of substances resulting in the formation of organic acids, we consider as coming within the scope of this invention. Thus various inorganic salts may also be employed or combinations of inorganic acids and inorganic salts with organic acids and organic salts.

We do not further limit ourselves to any particular procedure or concentration in connection with the addition of the organic acid. It may be added all at one time or in two or more stages at different times. When employed in conjunction with an inorganic acid, the organic acid may be added at the same time as the inorganic acid or it may be added at an earlier or later stage of process as desired. All of these differences are regarded as merely variations in details of procedure and as essentially coming within the scope of our invention.

What we claim as new and desire to secure by United States Letters Patent is:

1. In a method of manufacturing gelatin from pigskins the step which consists in acidulating the pigskins with citric acid.

2. In a method of manufacturing gelatin from pigskins the step which consists in acidulating the pigskins with tartaric acid.

3. As a new composition, a gelatin citrate complex resulting from the hydrolysis of the collagen of pigskins in the presence of citric acid.

4. As a new composition, a gelatin tartrate complex resulting from the hydrolysis of the collagen of pigskins in the presence of tartaric acid.

5. In a method of manufacturing gelatin the step which consists in acidulating the gelatin-yielding raw material with one or more organic acids of the group consisting of tartaric and citric acids, then hydrolyzing.

6. In a method of manufacturing gelatin the step which consists in acidulating the gelatin-yielding raw material with citric acid, then hydrolyzing.

7. In a method of manufacturing gelatin the step which consists in acidulating the gelatin-yielding raw material with tartaric acid, then hydrolyzing.

8. In a method of manufacturing gelatin the step which consists in acidulating the gelatin-yielding raw material with one or more organic acids of the group consisting of tartaric and citric acids, in conjunction with one or more inorganic acids, then hydrolyzing.

9. In a method of manufacturing gelatin the step which consists in acidulating the gelatin-yielding raw material with one or more inorganic acids in conjunction with one or more organic acids of the group of organic acids consisting of tartaric and citric acids, then hydrolyzing.

10. As a new composition, a gelatin derivative of an organic acid of the group consisting of tartaric and citric acids, resulting from the hydrolysis of collagen in the presence of said acid.

11. As a new composition, a gelatin citrate complex resulting from the hydrolysis of collagen in the presence of citric acid.

12. As a new composition, a gelatin tartrate complex resulting from the hydrolysis of collagen in the presence of tartaric acid, then hydrolyzing.

13. In a method of manufacturing gelatin from pigskins the step which consists in acidulating the pigskins with one or more organic acids of the group consisting of tartaric and citric acids, then hydrolyzing.

14. In a method of manufacturing gelatin from pigskins the step which consists in acidulating the pigskins with one or more organic acids of the group consisting of tartaric and citric acids in conjunction with one or more inorganic acids, then hydrolyzing.

15. In a method of manufacturing gelatin from pigskins the step which consists in acidulating the pigskins with one or more inorganic acids in conjunction with one or more organic salts of the group of organic acids consisting of tartaric and citric acids, then hydrolyzing.

16. As a new composition, a gelatin derivative of an organic acid of the group consisting of tartaric and citric acids, resulting from the hydrolysis of the collagen of pigskins in the presence of said acid.

CHESTER H. EPSTEIN.
NATHAN R. GOTTHOFFER.